United States Patent
Ezumi et al.

(10) Patent No.: US 6,722,555 B2
(45) Date of Patent: Apr. 20, 2004

(54) FRICTION STIR WELDING METHOD

(75) Inventors: Masakuni Ezumi, Kudamatsu (JP);
Kazushige Fukuyori, Kudamatsu (JP);
Tsuyoshi Mizusaki, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/781,289

(22) Filed: Feb. 13, 2001

(65) Prior Publication Data

US 2001/0019073 A1 Sep. 6, 2001

(30) Foreign Application Priority Data

Mar. 6, 2000 (JP) ...................................... 2000-060202
Oct. 19, 2000 (JP) ...................................... 2000-318730

(51) Int. Cl.$^7$ ............................................... B23K 20/12
(52) U.S. Cl. .................................... 228/112.1; 228/2.1
(58) Field of Search ............................. 228/112.1, 2.1, 228/159, 160

(56) References Cited

U.S. PATENT DOCUMENTS

| | | | |
|---|---|---|---|
| 3,605,253 A | * 9/1971 | Calton et al. ............... | 156/73.5 |
| 4,019,018 A | * 4/1977 | Oishi et al. ............... | 219/137 R |
| 5,201,455 A | 4/1993 | Reynolds, Jr. et al. | |
| 5,205,529 A | * 4/1993 | Killian ...................... | 248/636 |
| 5,697,544 A | 12/1997 | Wykes | |
| 5,713,507 A | * 2/1998 | Holt et al. ................ | 228/112.1 |
| 5,718,366 A | * 2/1998 | Colligan .................... | 156/580 |
| 5,769,306 A | * 6/1998 | Colligan .................... | 228/112.1 |
| 5,971,252 A | 10/1999 | Rosen et al. | |
| 5,975,406 A | * 11/1999 | Mahoney et al. | |
| 6,019,013 A | * 2/2000 | Luik ......................... | 74/490.01 |
| 6,173,880 B1 | * 1/2001 | Ding et al. | |
| 6,259,052 B1 | * 7/2001 | Ding et al. ............. | 219/125.11 |
| 6,315,187 B1 | * 11/2001 | Satou et al. | |

FOREIGN PATENT DOCUMENTS

| | | |
|---|---|---|
| EP | 0810054 A1 * | 12/1997 |
| EP | 0810055 | 12/1997 |
| EP | 0888843 | 1/1999 |
| EP | 0893189 | 1/1999 |
| EP | 1057573 A2 * | 12/2000 |
| EP | 1132167 A2 * | 9/2001 |
| GB | 2011815 | 7/1979 |
| JP | 2-89577 | 3/1990 |
| JP | 10-230372 | 9/1998 |
| JP | 11-170071 | 6/1999 |
| JP | 11-197855 | 7/1999 |

(List continued on next page.)

OTHER PUBLICATIONS

US 2001/0019073 A1 Ezumi et al. (Sep. 6, 2001).*
European Search Report dated Jan. 30, 2003, for EP 02 02 5240.

(List continued on next page.)

*Primary Examiner*—Tom Dunn
*Assistant Examiner*—Kiley Stoner
(74) *Attorney, Agent, or Firm*—Antonelli, Terry, Stout & Kraus, LLP

(57) ABSTRACT

On a main shaft 30 of a numeric control type machine tool, a rotary tool 50 is installed. The main shaft 30 is not inclined in the machine tool. A first member 70 and a second member 76 to be subjected to friction stir welding are fixed on a table 20. Relative to an axial center of the rotary tool 50, a non-linear welding portion of the first member 70 and the second member 76 is inclined by inclining the table 20. Then, by rotating the table 20 and relatively moving the portion to be welded into contact with the rotary tool 50, welding of the first member to the second member is carried out according to friction stir welding. The above-stated inclination is the inclination required for the friction stir welding. In this way, welding along a path of ring shape or circular shape (including a circular arc) using friction stir welding can be carried out easily.

10 Claims, 3 Drawing Sheets

FOREIGN PATENT DOCUMENTS

| JP | 11-197856 | | 7/1999 |
|----|-----------|---|--------|
| JP | 11-226759 | | 8/1999 |
| JP | 2000202646 A | * | 7/2000 |
| JP | 02001321966 A | * | 11/2001 |

OTHER PUBLICATIONS

Patent Abstracts of Japan, Publication No. 2001047261 Feb. 20, 2001.

Patent Abstracts of Japan, Publication No. 2000042759, Feb. 15, 2000.

Patent Abstracts of Japan, Publication No. 10193140, Jul. 28, 1998.

Patent Abstracts of Japan, Publication No. 02089577, Mar. 29, 1990.

Patent Abstracts of Japan, Publication No. 10230372, Sep. 2, 1998.

* cited by examiner

FRICTION STIR WELDING METHOD

BACKGROUND OF THE INVENTION

The present invention relates to friction stir welding along a non-linear path, for example, a circular-shaped path.

As disclosed in Japanese application patent laid-open publication No. Hei 9-309164 (EP 0797043 A2), a friction stir welding is a method in which, by rotating a round rod (hereinafter called "a rotary tool"), inserting the rotary tool into a welding joint and moving the rotary tool along to the welding line, the welding portion is heated, softened and plastically fluidized and is solid-stately welded.

The rotary tool is comprised of a small diameter portion (called "a pin"), which is inserted into the welding joint, and a large diameter portion (called "a shoulder"), which is positioned adjacent the small diameter portion of the rotary tool. The small diameter portion and the large diameter portion of the rotary tool have the same axis. The large diameter portion of the rotary tool is driven so that the rotary tool is rotated.

Japanese application patent laid-open publication No. Hei 11-197855, discloses a welding method for use a case in which a welding line between two members has a ring shape (a circular shape). After a start end and a finish end of a welding have overlapped, the finish end is finished in a ring-shaped inner portion or a ring-shaped outer portion of the welding line. Accordingly, after the friction stir welding has been completed and the rotary tool is withdrawn from the welded member, a hole corresponding to the small diameter portion (the pin) of the rotary tool is left in the welded member. When a drawing position is a ring-shaped position to be welded, a problem in the strength of the weld results.

Further, the rotary tool, which comprises a small diameter portion that is inserted into the welding portion and a large diameter portion that is positioned adjacent to and outside of the small diameter portion, is inserted at an angle so s to be inclined relative to the member to be welded. The direction of inclination is such that, in a moving direction (a direction to be welded) of the rotary tool, the small diameter portion of the rotary tool is positioned in front of and leads the large diameter portion of the rotary tool. In other words, the rotary tool is inclined to the rear relative to the direction of movement. The above fact is disclosed also in Japanese patent laid-announcement No. Hei 9-508073 (EP 0752926 B1).

In Japanese application patent laid-open publication No. Hei 11-197855, the inclined rotary tool is moved along a circular path. However, it is extremely difficult to move an inclined rotary tool along a path having a circular shape. To accommodate various kinds of circular shapes, it has been suggested that the welding should be carried out using a numeric control type machine tool. In this type of machine tool, the member to be subjected to welding is fixed to a table, the rotary tool is installed on a main shaft of the machine tool, the main shaft is inclined relative to the table, and the main shaft is moved along a path having a circular shape. However, to maintain a predetermined inclination angle of the main shaft in a circular moving direction, it is necessary to vary the inclination angle with movement along the circular path; and, as a result, the preparation of programs to control such movements is not easily carried out.

SUMMARY OF THE INVENTION

An object of the present invention is provide to a friction stir welding method in which welding along a path having a ring shape or a circular shape (a circular arc is included) during the friction stir welding can be carried out easily.

The above-stated object can be attained by a friction stir welding method, characterized in that a first member and a second member are fixed on a table of a machine tool having a main shaft onto which a rotary tool is installed; and then, the table is rotated relative to an axial center of the desired non-linear welding line, and also relative to the direction in which the first member and the second member are to be welded, under a state in which the table is inclined, so as to effect relative movement between the members to be welded and the rotary tool, thereby carrying out friction stir welding of the first and second members.

DESCRIPTION OF THE INVENTION

Figure 1:
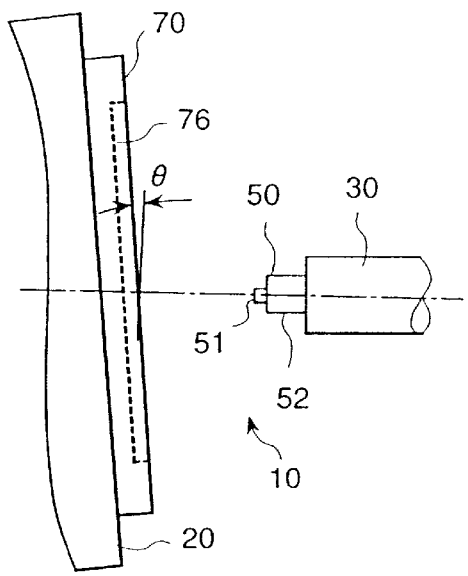
FIG. 1 is a side view of a object to be subjected to friction stir welding according to one embodiment of the present invention.
Figure 2:
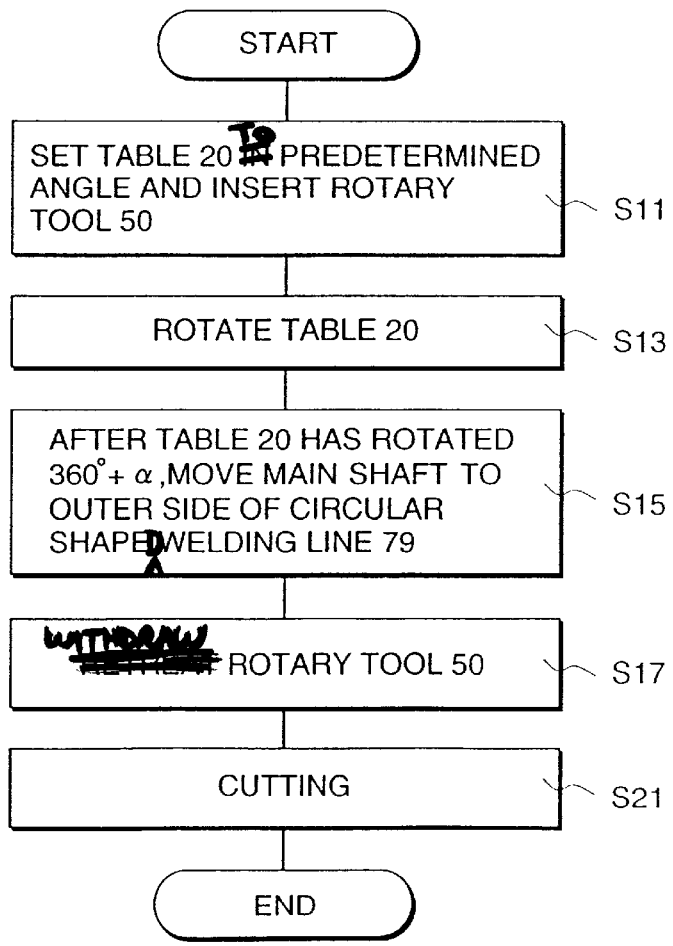
FIG. 2 is a flow chart of a friction stir welding process according to one embodiment of the present invention.
Figure 3:
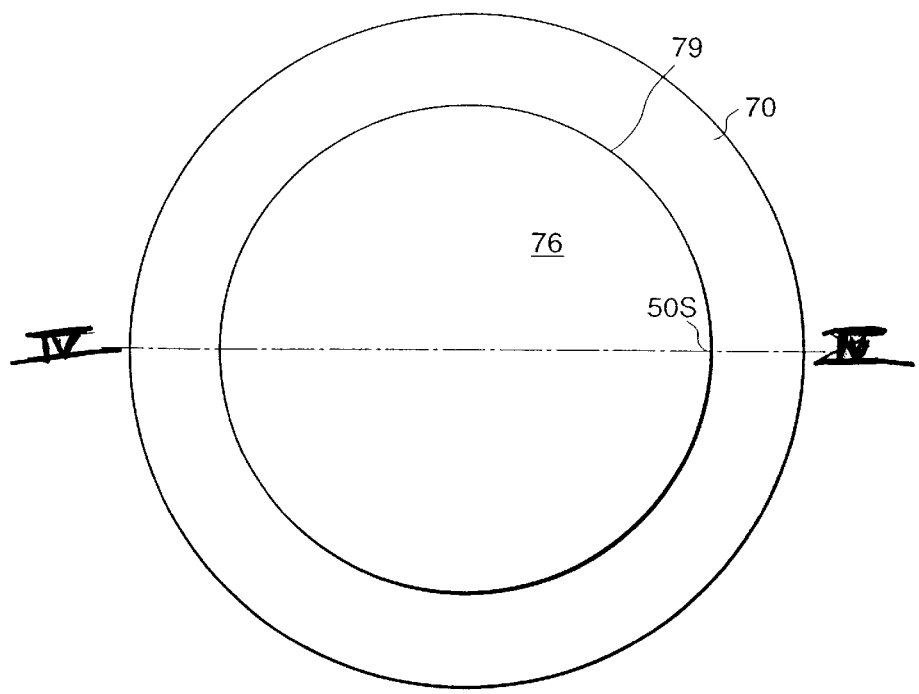
FIG. 3 is a plane view of an object before a welding.
Figure 4:
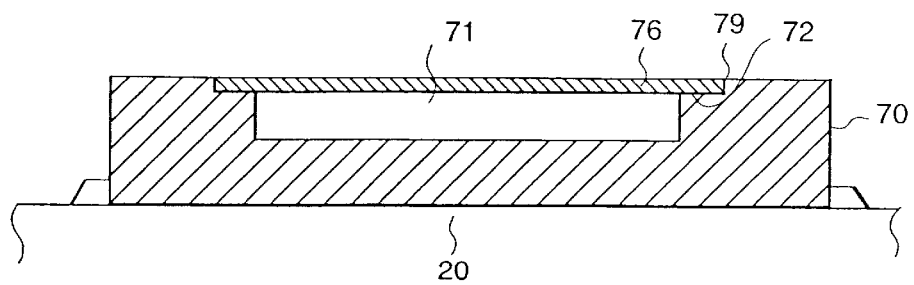
FIG. 4 is a longitudinal cross-sectional view taken along line IV—IV in FIG. 3.

A friction stir welding method according to one embodiment of the present invention will be explained with reference to FIG. 1 to FIG. 7. FIG. 4 is a cross-sectional view taken along line IV—IV in FIG. 3. The reference numeral 10 in FIG. 1 generally refers to elements of a numeric control type machine tool, which typically comprises a machining center. The machine tool has a table 20 for mounting an object to be subjected to processing (in this case to be subjected to welding), and a main shaft 30 for processing the object to be subjected to welding. The main shaft 30 carries a welding tool 50 and can be rotated to carry out friction stir welding. The machine tool of this embodiment according to the present invention is of the lateral axis type, in which the axis of the main shaft 30 is oriented in a horizontal direction. The surface of the table 20 for mounting (fixing) the object to be subjected to welding is oriented substantially in the vertical direction, with the center axis thereof being slightly inclined to the horizontal by an angle θ, as seen in FIG. 1. The table 20 is mounted so that it can be rotated about its center axis, which is inclined to the horizontal.

On a tip end of the main shaft 30, a cutting rotary tool operating as a machine tool or a friction stir welding rotary tool 50 can be installed. Herein, the friction stir welding rotary tool 50 is installed so that the tip end 51 of the rotary tool 50 is directed toward the table 20. The axial center of the main shaft 30 and the rotary tool 50 is oriented in the horizontal direction. The rotary tool 50 is rotated by rotation of the main shaft 30. The main shaft 30 is mounted so as to be able to move in an axial direction, as well as in a radial direction.

The machine tool has a tool stocking device comprised of plural cutting rotary tools and plural friction stir welding rotary tools, and an automatic exchange device is provided for exchanging a desirable rotary tool between the tool stocking device and the main shaft.

A member 70 to be subjected to welding is fixed to the table 20 using known means. As seen in FIG 4, a circular-shaped recess 71 is provided in the member 70 on the side of the main shaft 30. In an outer peripheral portion of the circular-shaped recess 71, an annular step 72 is provided. The step 72 and the outer face of the member 70 form substantially flat parallel planar surfaces. This flat face of the step 72 is oriented in a rectangular direction relative to the axial direction of the circular shape recess.

In the recess formed by the step 72, a circular-shaped plate cover 76 is inserted. The outer surface of the member 70 and the outer surface of the cover 76 are disposed in the same plane. The butted portion between the circular periphery of the cover 76 and the circular periphery of the step 72 is subjected to friction stir welding. Accordingly, the portion 79 to be welded (the welding line) has the form of a ring of circular shape. The reference numeral 79b in FIG. 5 indicates the welding bead which is produced by the welding.

The butted portion between the member 70 and the cover 76 is first temporarily welded at intermittent portions by arc welding to hold the cover 76 in position. After the temporary arc welding, the member 70 is fixed to the table 20 and friction stir welding is carried out. When the members 70 and 76 are joined by friction stir welding, a space is formed by the recessed portion 71 and the cover 76 which serves as a cooling passage. An inlet and an outlet of the cooling passage are not shown in the figure. The member 70 and the cover 76 form a part of a cooling machine. The member 70 and the cover 76 are made of aluminum alloys.

The table 20 can be rotated about the center of the circular-shaped welding line 79 as a rotation center. In this regard, the member 70 is mounted on the table 20 so that the rotation center of the table 20 and the center of the circular-shaped welding line 79 are coincident. The rotary tool 50, fixed to the main shaft 30, is held stationary at first, so that it can not move in the circumferential direction of the welding line 79; it can only be rotated with the rotation of the main shaft 30. However, by rotation of the table 20, the rotary tool 50 is moved relatively along the welding line 79.

Figure 5:
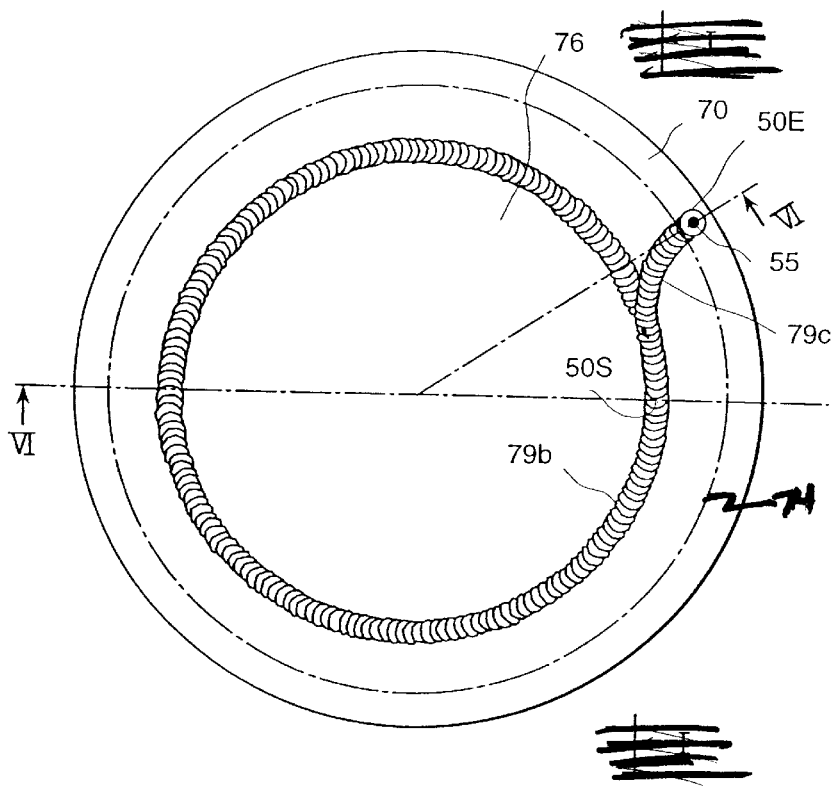
FIG. 5 is a plane view of the object after welding.
Figure 6:
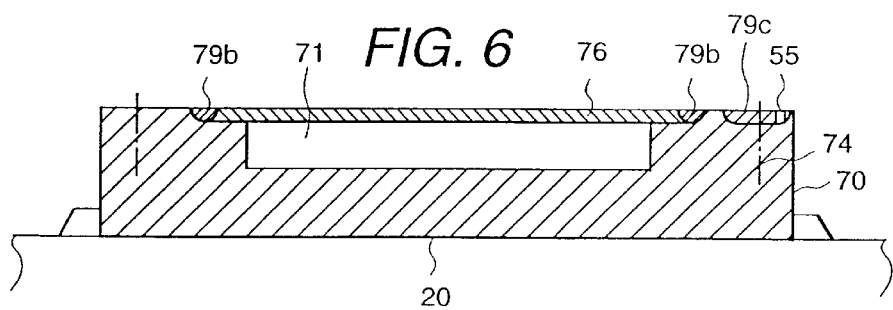
FIG. 6 is a cross-sectional view taken along line VI—VI in FIG. 5.
Figure 7:
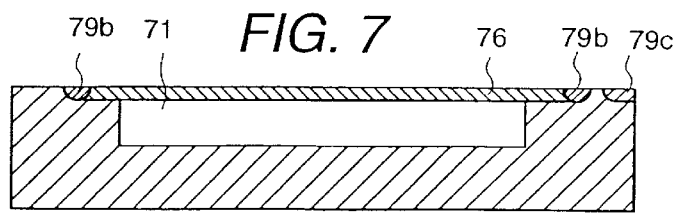
FIG. 7 is a longitudinal cross-sectional view of the welded members of FIG. 6 after the outer periphery has been cut off.

The rotary tool 50, fixed to the main shaft 30, is positioned at a position 50S, which is a position on a horizontal plane through the axial center of the welding line 79. With the rotary tool 50 at this position 50S, the table 20 is inclined away with respect to the relative moving direction of the rotary tool 50 during the friction stir welding. Due to the inclination of the table 20 in the above-stated moving direction (the direction to be welded), the small diameter portion 51 of the rotary tool 50 is positioned in front of the large diameter portion 52 of the rotary tool 50 in the welding direction. When the table is operated in the standard manner, and the rotation direction of the table 20 is counter-clockwise, the small diameter portion 57 of the rotary tool will be positioned to the rear of the large diameter portion 52 of the rotary tool 50 in the direction of rotation. The inclination angle θ of the table 20 is three (3) degrees, for example. In FIG. 3 and FIG. 5, the rotary tool 50 is positioned at point 50S on the circular-shaped welding line 79; and since the table 20 is rotated in a clockwise direction, an upper side of the table 20 (the member 70) is inclined away relative to the lower side so as to separate from the rotary tool 50.

The welding process of this embodiment according to the present invention will be explained. With the table 20 inclined with respect to the vertical by the above-stated three (3) degrees, the cover 76 is fixed to the member 70 by temporary arc welding. The rotary tool 50 is then positioned at the predetermined position 50S. In this state, by rotating (rotating on its own axis) the main shaft 30, the rotary tool 50 is rotated, and then it is moved in the axial direction, so that the small diameter portion 51 of the rotary tool 50 is inserted into the butted portion 79. When the rotary tool 50 has been inserted to a predetermined depth; the axial movement of the rotary tool 50 is stopped. The insertion position of the rotary tool 50 is the position 50S in FIG. 3, which is a start point of the welding (step S11).

Next, under the state in which the inclination angle of three (3) degrees is maintained, the table 20 is rotated. The rotation direction of the table 20 is the left-rotation (step S13). The center of rotation of the table 20 is the center of the circular welding line 79. Accordingly, the rotary tool 50 is moved relatively along to the welding line 79 and the circular-shaped butted portion is subjected to friction stir welding. The reference numeral 76b indicates a welding bead produced by the friction stir welding operation.

When by rotation of the table 20 the table again reaches a state where the tool 50 reaches the position 50S at which the rotary tool 50 was originally inserted, namely when the table 20 has rotated through 360 degrees, the rotation of the table 20 is continued. Accordingly, from the start point 50S of the friction stir welding, the welding is carried out again.

Next, when the table 20 has rotated through a predetermined angle of 360 degrees + α, the main shaft 30 is moved in the radial direction (step S15). Herein, the main shaft 30 is moved outwardly from the circular-shaped welding line 79 as the table 20 is made to continue its rotation. The inclination angle θ of the table is not varied. Accordingly, outside of the circular welding line 79, an arc-shaped welding bead 70c is formed, as seen in FIG. 5. The inclination angle θ of the rotary tool 50 with respect to the relative direction of movement of the rotary tool 50 from the point at the angle 360 degrees + α (the point from which the main shaft 30 is started to move in the radial direction) must be the above stated three (3) degrees to effect a proper weld. However, since this portion of the member 70 is not normally a portion to be subjected to friction stir welding, this requirement of the regular friction stir welding can be dispensed with.

When the rotary tool 50 has moved to a predetermined position 50E, the main shaft 30 (namely, the rotary tool 50) is withdrawn from the member 70 at the end of the welding line 79c (step S17). The position of withdrawal of the main shaft 30 is determined by the extent of radial movement of the main shaft 30. The withdrawal position of the main shaft 30 is located just inside of the outer diameter of the member 70. At the position (the finish point of the welding) where the rotary tool 50 is withdrawn from the member 70, a hole 55, which corresponds to the outer diameter of the small diameter portion 51 of the rotary tool 50, remains.

After the friction stir welding has been completed, the member 70 is removed from the table 20, and using another machine tool, the unnecessary peripheral portion of the member 70 is cut off. Herein, the portion of the member 74 outside of the circular-shaped welding line 79 is cut off to leave a circular shape (step S21). The reference numeral 74 in FIG. 5 and FIG. 6 indicates the cut-off position. Since the hole 55 remains at the finish point of the welding, the portion with this hole 55 is removed by cutting off an outer peripheral portion of the member 70 according to a machine processing. Further, since burrs and recessed portions often remain in the welded portion, the face that has been welded (an upper face in FIG. 6) is machined, if necessary. As a result, the hole 55 in the welding portion is removed, and the side that has been welded becomes flat, so that a good product appearance can be obtained.

Accordingly, it is unnecessary to incline the rotary tool 50 and to move the rotary tool 50 along the circular shape. Using a machine tool in which the main shaft 30 (the rotary tool 50) is not inclined, friction stir welding can be effectively carried out. Further, in a case where the main shaft 30 is inclined, the design of a program for maintaining the predetermined angle θ of the rotary tool along the entire length of the path of circular shape is troublesome and expensive. However, according to the above-stated embodiment, since the required inclination is provided by the table 20, the design of high cost programs becomes unnecessary. Accordingly, according to the present invention, friction stir welding can be carried out in a low cost and simple way using an existing machine tool.

The cut-off processing is carried out according to demand. The hole 55 at the finish point of the welding can be bored out by a drill machine and the like, and the hole can be used as a bolt hole and the like Further, the hole 55 can be buried using TIG (Tungsten Inert Gas) welding, and the welded surface can be machined. As a welding rod for the TIG welding, the same material as that of the member 70 is used. Accordingly, the welding portion where the hole is formed will be hardly seen even in the case where no coating is applied.

At the side of the main shaft 30, an optical type sensor for detecting the position of the butted portion is provided, and, based on the output of this optical type sensor, the position of the main shaft 30 can be moved. The moving direction of the main shaft 30 is a rectangular direction with respect to the relative direction of movement due to the rotation of the table 20. Accordingly, even when the accuracy of a first member (70) and the accuracy of a second member (76) in the butted portion (the joining line 79) are inferior, the axial center of the rotary tool 50 can be positioned at the center of the circular butted portion.

Further, the welding lines of the object to be welded may be a circular path, a ring-shaped free curved line, an non-ring-shaped circular line, and a non-ring-shaped free curved line. In the case of the free curved line, the table 20 can be rotated around the center of the circular arc of the welding portion as a center while the table 20 as a whole is moved in a linear direction. Since the machine tool is of the numeric control type, the welding can be carried out easily along welding lines having the form of various curved lines. The hole 55 at the finish point of the welding, in the case of a circular arc-shaped line, will be buried using welding or soldering. Further, it is possible to carry out friction stir welding along a welding line which comprises four (4) linear sides. In this case, to achieve welding along a path having four (4) linear sides, the table is moved linearly. At the time of welding the intersecting portions of the side of the circular arc portions in the vicinity of the corners, the table 20 is rotated.

Further, not only the welding of a butted portion, but also a portion in which two members are overlapped can be welded. Further, it is possible to use a longitudinal type machine tool.

When the welding has been completed in an inner side of the circular welding line, for example, the inner side member is removed according to a counter boring processing.

The rotary tool 50 is inclined relative to the moving direction, and the rotation for effecting relative movement is carried out by the table 20. Since the inclination of the rotary tool 50 and the circular movement of the rotary tool 50 are independent, the welding can be carried out at a low cost and easily.

Further, after the friction stir welding has been carried out, under the state where the member 70 is fixed to the table 20, the rotary tool 50 on the main shaft 30 is exchanged for a cutting rotary tool. The exchange is carried out using an automatic exchanging device disposed between the main shaft 30 and a tool stocking device. After that, by rotating the main shaft, the cutting tool is rotated, and an unnecessary portion of the member 70 is cut off. However, when friction stir welding has been carried out, the oil used for the cutting and the oil for cleaning after the cut-off processing exert a bad influence on the friction stir welding joint. Further, depending on the residual stock removal, the combination accuracy in the two members may become bad. However, after friction stir welding has been carried out, since the unnecessary portion is cut off, the above-stated problems can be eliminated. Before the friction stir welding, the cut-off of the two member may be carried out, however the removal of the cutting oil is to be carried out sufficiently using another machine. As cut-off processes, for example, there are an enlargement with a desirable diameter of the hole 55 at the time of withdrawal of the rotary tool 50, as well as a screw cutting process.

Further, friction stir welding of a pair of members to be subjected to welding may be carried out in a first welding portion of the members using a first rotary tool; next, between the main shaft and the tool stocking device, the first rotary tool is exchanged for a second rotary tool; and then, friction stir welding of a second welding portion of the above-stated members to be subjected to welding is carried out using the second rotary tool.

The technical range of the present invention is not limited by the foregoing embodiments or the described means for solving the problems of the prior art, but also includes a range in which one of ordinary skill in this technical field would recognize obvious equivalents.

According to the present invention, friction stir welding can be carried out along a path having a ring shape, circular shape, free curved line shape, and a circular arc shape easily and at low cost.

What is claimed is:

1. A friction stir welding method, characterized in that
    installing a friction stir welding use rotary tool to a main shaft in which an axial center thereof directs in a horizontal direction or in a vertical direction, fixing a first member and a second member on a table which opposes to a tip end of said rotary tool; and
    in a direction in which said first member and said second member are subjected to welding, to position a side of a small diameter portion of an axis center of said rotary tool in a front portion from a side of a large diameter portion of said rotary tool, under a state an axis center of said table is inclined, by rotating said table, moving a portion to be subjected to welding against said rotary tool, and carrying out a friction stir welding to said portion to be subjected to welding.

2. In a friction stir welding method according to claim 1, the friction stir welding method characterized in that
    said machine tool is a numeric control type machine tool.

3. In a friction stir welding method according to claim 1, the friction stir welding method characterized in that
    during the friction stir welding, accompanying with a rotation of said table, moving linearly said table.

4. In a friction stir welding method according to claim 1, the friction stir welding method characterized in that
    during the friction stir welding, carrying out independently a rotation of said table and a linear move of said table.

5. In a friction stir welding method according to claim 1, the friction stir welding method characterized in that to a member for supporting said main shaft, providing a sensor for detecting said portion to be subjected to welding;

to position said rotary tool in said portion to be subjected to welding of said first member and said second member, according to a detection value of said sensor, moving relatively said main shaft supporting member against said table.

6. A friction stir welding method, comprising:

installing a friction stir welding use rotary tool to a main shaft such that an axial center of the rotary tool is directed in a horizontal direction or in a vertical direction, fixing a first member and a second member on a table which opposes to a tip end of said rotary tool, from a direction from which said first member and said second member are subjected to welding, positioning a small diameter portion of said rotary tool, in a front portion of said rotary tool adjacent a large diameter portion of said rotary tool behind said front portion, under a state that the axial center of said rotary tool, relative to the table, is inclined, rotating said table, moving a portion to be subjected to welding against said rotary tool, and carrying out a friction stir welding to said portion to be subjected to welding.

7. A friction stir welding method according to claim 6, wherein said machine tool is a numeric control machine tool.

8. A friction stir welding method according to claim 6, wherein during the friction stir welding, accompanying a rotation of said table, said table is moved linearly.

9. A friction stir welding method according to claim 6, wherein during the friction stir welding, a rotation of said table and a linear movement of said table are carried out independently.

10. A friction stir welding method according to claim 6, further comprising:

to a member for supporting said main shaft, providing a sensor for detecting said portion to be subjected to welding; and said positioning the small diameter portion of said rotary tool in said portion to be welded of said first member and said second member is according to a detection value of said sensor, moving relatively said main shaft against said table.

* * * * *